(12) United States Patent
Jeon et al.

(10) Patent No.: US 9,742,220 B2
(45) Date of Patent: Aug. 22, 2017

(54) AUXILIARY POWER SUPPLY DEVICES AND ELECTRONIC SYSTEMS EMPLOYING THE SAME

(71) Applicants: Sang-hun Jeon, Suwon-si (KR); Ik-sung Park, Seoul (KR); Cheol Kwon, Suwon-si (KR)

(72) Inventors: Sang-hun Jeon, Suwon-si (KR); Ik-sung Park, Seoul (KR); Cheol Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 451 days.

(21) Appl. No.: 14/514,950

(22) Filed: Oct. 15, 2014

(65) Prior Publication Data

US 2015/0102668 A1     Apr. 16, 2015

(30) Foreign Application Priority Data

Oct. 15, 2013  (KR) .......................... 10-2013-0122953

(51) Int. Cl.
 *H02J 4/00*    (2006.01)
 *H02J 9/06*    (2006.01)

(52) U.S. Cl.
 CPC ........... *H02J 9/061* (2013.01); *Y10T 307/344* (2015.04); *Y10T 307/615* (2015.04)

(58) Field of Classification Search
 CPC ................. H02J 9/061; H02J 4/00; H02J 7/00
 See application file for complete search history.

(56) References Cited

U.S. PATENT DOCUMENTS

| 5,045,769 | A | * | 9/1991 | Everett, Jr. | .......... | G05D 1/0225 |
|---|---|---|---|---|---|---|
| | | | | | | 320/107 |
| 5,631,811 | A | * | 5/1997 | Huh | ..................... | H02M 3/335 |
| | | | | | | 363/132 |
| 5,920,181 | A | | 7/1999 | Alberkrack et al. | | |
| 5,990,575 | A | * | 11/1999 | Flaugher | ................. | H02J 1/108 |
| | | | | | | 307/23 |
| 6,100,664 | A | | 8/2000 | Oglesbee et al. | | |
| 6,455,954 | B1 | * | 9/2002 | Dailey | .................... | H02J 9/062 |
| | | | | | | 307/43 |
| 7,446,507 | B2 | | 11/2008 | Yokota et al. | | |
| 8,049,469 | B2 | | 11/2011 | Kim | | |
| 2009/0085521 | A1 | * | 4/2009 | Kim | ..................... | H02J 7/0031 |
| | | | | | | 320/134 |

(Continued)

FOREIGN PATENT DOCUMENTS

| KR | 1020060088394 | 8/2006 |
|---|---|---|
| KR | 1020060096758 | 9/2006 |

(Continued)

*Primary Examiner* — Adi Amrany
*Assistant Examiner* — Win Htun
(74) *Attorney, Agent, or Firm* — Myers Bigel, P.A.

(57) ABSTRACT

An auxiliary power supply device can include an auxiliary power source configured to provide auxiliary power. An auxiliary power state detection circuit electrically can be coupled to an input or an output of the auxiliary power source and an auxiliary power supply circuit that can be electrically coupled to the output of the auxiliary power source, where the auxiliary power supply circuit can be configured to provide the auxiliary power to a target system when power supplied to the target system by a main power source is abnormal. Related systems are also disclosed.

15 Claims, 13 Drawing Sheets

(56) References Cited

U.S. PATENT DOCUMENTS

| | | | |
|---|---|---|---|
| 2009/0167312 A1 | 7/2009 | Keates et al. | |
| 2010/0214707 A1 | 8/2010 | Yun | |
| 2011/0228436 A1 | 9/2011 | Lee et al. | |
| 2012/0013175 A1* | 1/2012 | Newman, Jr. | B60R 16/033 307/9.1 |
| 2012/0268080 A1* | 10/2012 | Jeon | G06F 1/263 320/167 |
| 2013/0062949 A1* | 3/2013 | Yan | H02J 9/061 307/64 |
| 2016/0006255 A1* | 1/2016 | Hagstrom | H02J 9/005 307/126 |

FOREIGN PATENT DOCUMENTS

| | | |
|---|---|---|
| KR | 1020070076627 | 7/2007 |
| KR | 1020080095342 | 10/2008 |
| KR | 1020090081894 | 7/2009 |
| KR | 1020127010598 | 4/2012 |

* cited by examiner

AUXILIARY POWER SUPPLY DEVICES AND ELECTRONIC SYSTEMS EMPLOYING THE SAME

CROSS-REFERENCE TO RELATED APPLICATIONS

This application claims the benefit of Korean Patent Application No. 10-2013-0122953, filed on Oct. 15, 2013, in the Korean Intellectual Property Office, the disclosure of which is incorporated herein in its entirety by reference.

BACKGROUND

The inventive concept relates to an auxiliary power supply device and an electronic system employing the same, and more particularly, to an auxiliary power supply device that may efficiently and simply detect whether an auxiliary power source device is abnormal with no or little additional power consumption and overhead to help to improve the reliability of an electronic system, and an electronic system employing the auxiliary power supply device.

An auxiliary power supply device can be used to prevent data loss due to sudden power-off (SPO) in a solid state drive. However, assuming that more than one auxiliary power sources are used, even when one of the auxiliary power sources is abnormal, the other auxiliary power sources may be damaged and thus may not function normally. A conventional secondary battery or capacitor may be used as an auxiliary power source, but may have high power consumption and may be too large for some applications.

SUMMARY

Embodiments according to the inventive concept can provide auxiliary power supply devices and electronic systems employing the same. Pursuant to these embodiments, an auxiliary power supply device can include an auxiliary power source configured to provide auxiliary power. An auxiliary power state detection circuit electrically can be coupled to an input or an output of the auxiliary power source and an auxiliary power supply circuit that can be electrically coupled to the output of the auxiliary power source, where the auxiliary power supply circuit can be configured to provide the auxiliary power to a target system when power supplied to the target system by a main power source is abnormal.

In some embodiments according to the inventive concept, the auxiliary power state detection circuit can be configured to output a low output signal indicating a shortcircuit of the auxiliary power source. In some embodiments according to the inventive concept, the auxiliary power state detection circuit can include a resistive element and a unidirectional element. In some embodiments according to the inventive concept, the unidirectional element can be a diode. In some embodiments according to the inventive concept, the resistive element and the unidirectional element are electrically coupled in series with one another.

In some embodiments according to the inventive concept, a first terminal of the unidirectional element can be electrically coupled to the resistive element and a second terminal of the unidirectional element can be electrically coupled to the auxiliary power source. In some embodiments according to the inventive concept, the auxiliary power supply device can further include an auxiliary power charging circuit that can be configured to charge the auxiliary power source using the main power source based on a state of the low output signal.

In some embodiments according to the inventive concept, the auxiliary power supply device can further include a power monitoring circuit that can be configured to activate the auxiliary power supply circuit to provide the auxiliary power to the target system responsive to determining that the power supplied to the target system is abnormal. In some embodiments according to the inventive concept, the auxiliary power supply device can be configured to transmit a charge stop signal to the auxiliary power charging circuit based on the low output signal and a normality signal generated by the power monitoring circuit responsive to determining that the power supplied to the auxiliary power supply device is normal.

In some embodiments according to the inventive concept, the auxiliary power charging circuit can be configured to stop charging the auxiliary power source responsive to the charge stop signal. In some embodiments according to the inventive concept, the current consumed by the auxiliary power state detection circuit can be less than about 100 nA.

In some embodiments according to the inventive concept, an electronic system can include a main system circuit and a power management circuit, wherein the power management circuit can include an auxiliary power source that can be configured to provide auxiliary power and an auxiliary power state detection circuit that can be electrically coupled to an input or an output of the auxiliary power source. An auxiliary power supply circuit can be electrically coupled to the auxiliary power source, where the auxiliary power supply circuit can be configured to supply the auxiliary power to the main system circuit responsive to determining that power from a main power source is abnormal, wherein the auxiliary power state detection circuit can include a resistive element and a unidirectional element.

In some embodiments according to the inventive concept, the auxiliary power state detection circuit can be configured to output a low output signal when the auxiliary power source output is less than a predetermined minimum value. In some embodiments according to the inventive concept, the electronic system can further include a charge stop signal generating circuit that can be configured to transmit a charge stop signal to an auxiliary power charging circuit responsive to the low output signal and an indication that power from the main power source is normal.

In some embodiments according to the inventive concept, an auxiliary power supply device can include an auxiliary power source that can be configured to provide auxiliary power for a target system responsive to determining that main power to the target system is abnormal. An auxiliary power state detection circuit can include a unidirectional element electrically coupled to an input or an output of the auxiliary power source, the unidirectional element that can be configured to pull an auxiliary power state detection low output signal down from an off state into an on state responsive to a shortcircuit of the auxiliary power source.

In some embodiments according to the inventive concept, the auxiliary power state detection circuit can further include a resistive element that can be electrically coupled in series with unidirectional element, where the resistive element can be configured to pull the auxiliary power state detection low output signal up to the off state responsive to normal operation of the auxiliary power source.

In some embodiments according to the inventive concept, the unidirectional element can be a diode and the resistive element can be a resistor. In some embodiments according to the inventive concept, the auxiliary power supply device can further include an auxiliary power supply circuit that can be electrically coupled to the main power and to the output of the auxiliary power source, where the auxiliary power supply circuit can include a first unidirectional element coupled in series between a power input of the target system and the main power, and a second unidirectional element coupled in series between the output of the auxiliary power source and the power input of the target system.

In some embodiments according to the inventive concept, the target system can include a main system, where the main system can include a charge stop signal generating circuit that can be configured to receive an indication of normal main power and the auxiliary power state detection low output signal. In some embodiments according to the inventive concept, the auxiliary power supply device can further include an auxiliary power charging circuit that can be electrically coupled to the charge stop signal generating circuit and can be configured to stop charging the auxiliary power source responsive to the indication of normal main power and the auxiliary power state detection low output signal.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS ACCORDING TO THE INVENTIVE CONCEPT

Figure 1:
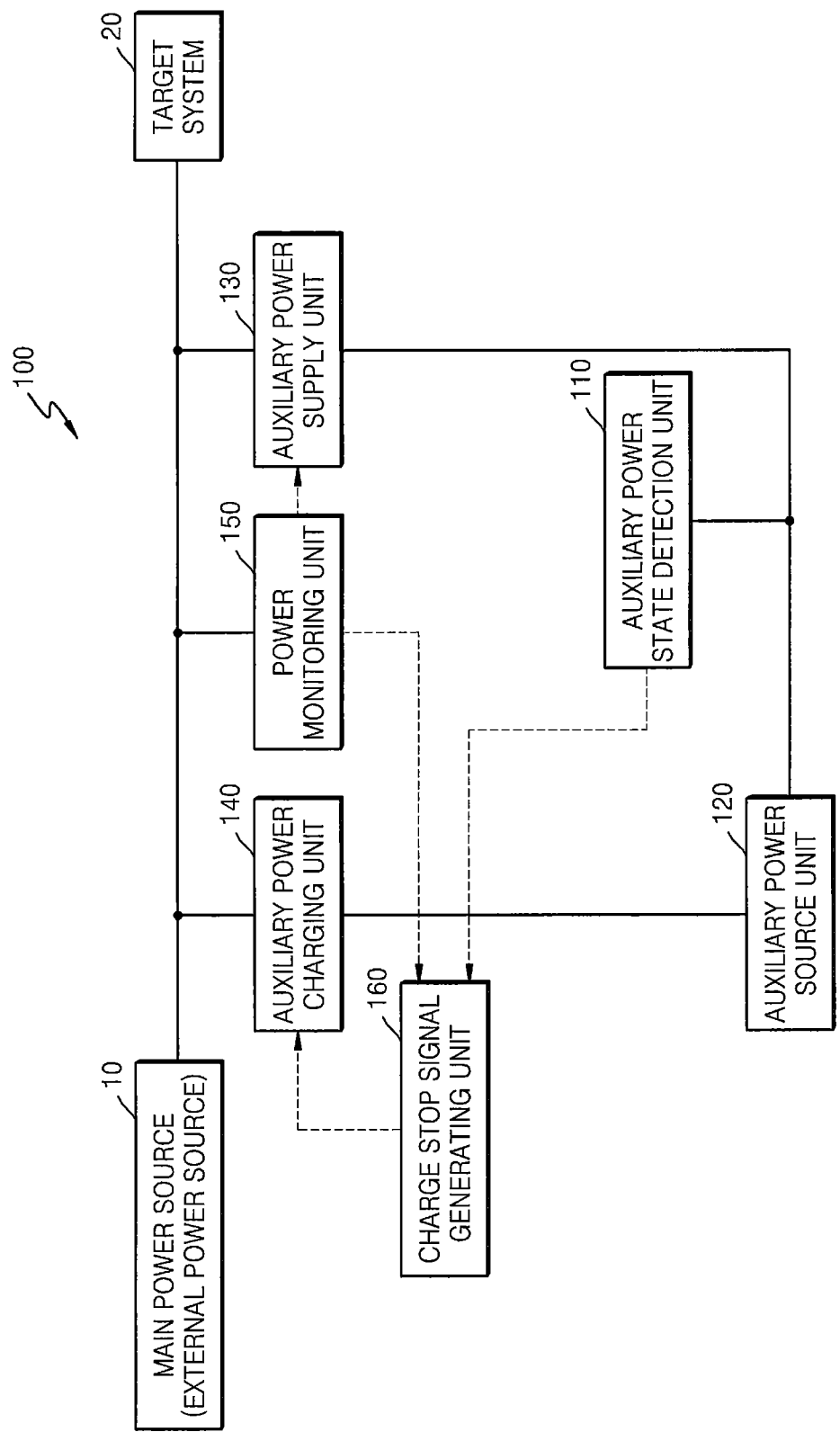
FIG. 1 is a block diagram illustrating an auxiliary power supply device according to some embodiments of the inventive concept.

Embodiments of the present inventive concept now will be described more fully hereinafter with reference to the accompanying drawings, in which embodiments of the present inventive concept are shown. This present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or one or more intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or one or more intervening elements or layers may also be present. In contrast, when an element is referred to as being "directly on" another element or layer, there are no intervening elements or layers present. As used herein, the term "and/or" includes any and all combinations of one or more of the associated listed items.

The terminology used herein is for the purpose of describing particular embodiments only and is not intended to be limiting of the present inventive concept. As used herein, the singular forms "a", "an" and "the" are intended to include the plural forms as well, unless the context clearly indicates otherwise. It will be further understood that the terms "comprises" "comprising," "includes" and "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive concept belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item. It will be further understood that the term "unit" as used herein can refer to the function of a corresponding circuit. Accordingly, the description of the unit will be understood to also relate to the underlying structure of the circuit which provides the function of the unit.

FIG. 1 is a block diagram illustrating an auxiliary power supply device 100 according to some embodiments of the inventive concept. Referring to FIG. 1, power may be supplied from a main power source 10 (e.g., an external power source) to a target system 20. The auxiliary power supply device 100 may be configured to receive power from the main power source 10 and to charge an auxiliary power source unit 120 (which can be included in the auxiliary power supply device 100) and may be configured to supply power from the auxiliary power source unit 120 to the target system 20 when power supplied by the main power source 10 is abnormal. It will be further understood that the term "abnormal" as used herein includes situations where the power does not meet operational specifications or requirements of the target system 20 or otherwise is determined to be unreliable for use with the target system 20, which can be determined over, for example, a specified time period. It will be further understood that the term "normal" will be understood to mean situations to which the term "abnormal" does not apply. Accordingly, an abnormal situation can include operations where the main power source is determined to be unstable, of unsuitable quality, has a voltage level that is too great or too low for acceptable use by the target system 20, or the like.

An auxiliary power source unit 120 may store electrical energy that is to be supplied as auxiliary power, and may include, for example, a secondary battery and/or a capacitor. Other devices can also be used to store electrical energy for use by the power source unit 120.

In detail, the secondary battery may be any type of battery such as a lithium ion battery, a lithium polymer battery (e.g., a solid-type lithium polymer battery having no organic electrolytic solution, or a lithium ion polymer battery using a gel-type polymer electrolyte containing an organic electrolytic solution), a nickel-metal hydride (NiMH) battery, a nickel-cadmium battery, or a lithium air battery.

The secondary battery may generally include an anode, a cathode, and a separator that is disposed between the anode and the cathode. The anode may include an anode substrate and an anode active material, and the cathode may include a cathode substrate and a cathode active material.

The cathode substrate may be formed of, for example, aluminium, and the cathode active material may be, for example, $LiCoO_2$, however, the present embodiment of the inventive concept is not limited thereto. The cathode active material may include a silicon-based material, a tin-based material, an aluminium-based material, or a germanium-based material. The anode substrate may be formed of, for example, copper, and the anode active material may be a carbon-based material such as graphite.

Also, the capacitor may be, for example, but is not limited to, an electrolytic capacitor, tantalum capacitor, a multi-layer ceramic capacitor, an electrical double-layer capacitor, or a polymer membrane capacitor.

As described above, electrical energy that is stored in the auxiliary power source unit 120 can be supplied to the target system 20 when the power supplied by main power source 10 is unacceptable (i.e., abnormal) to the target system 20. The supply of auxiliary power to the target system 20 can be supervised by an auxiliary power supply unit 130.

Whether the auxiliary power supply unit 130 supplies auxiliary power to the target system 20 may be determined by a power monitoring unit 150. In other words, the power monitoring unit 150 can be configured to continuously monitor whether power supplied by the main power source 10 is normal or abnormal. The auxiliary power supply unit 130 may be configured to supply auxiliary power to the target system 20 when power supplied by the main power source 10 is abnormal as determined by the power monitoring unit 150.

An auxiliary power charging unit 140 receives power from the main power source 10 and charges the auxiliary power source unit 120. When the auxiliary power source unit 120 stops being charged, however, electrical energy of the auxiliary power source unit 120 may gradually decrease over time. Accordingly, the auxiliary power source unit 120 can be periodically charged. In particular, when the capacity of the auxiliary power source unit 120 is small, the auxiliary power source unit 120 may discharge quickly. Accordingly, the charge of the auxiliary power unit 120 may be maintained constantly.

As appreciated by the present inventors, if auxiliary power source unit 120 continues to be charged even though the auxiliary power source unit 120 is shortcircuited, other portions of the auxiliary power source unit 120 and/or the auxiliary power charging unit 140 may be damaged and may fail to function as an auxiliary power source. Accordingly, the auxiliary power charging unit 140 may be configured to stop the supply of power to the auxiliary power source unit 120 when the auxiliary power source unit 120 is determined to be shortcircuited.

An auxiliary power state detection unit 110 may be connected to an output of the auxiliary power source unit 120, and configured to detect whether the auxiliary power source unit 120 is shortcircuited. Also, the auxiliary power state detection unit 110 may be configured to output a corresponding signal upon detecting that the auxiliary power source unit 120 is shortcircuited.

A charge stop signal generating unit 160 is configured to receive a signal output from the auxiliary power state detection unit 110 and to determine whether to stop power supplied to the auxiliary power source unit 140. However, since it may be difficult to correctly determine when to stop charging using only a signal output from the auxiliary power state detection unit 110, the charge stop signal generating unit 160 may be configured to also receive a signal from the power monitoring unit 150 indicating whether power supplied by the main power source 10 is normal or abnormal. The charge stop signal generating unit 160 may determine whether the auxiliary power charging unit 140 is to interrupt the power supply to the auxiliary power source unit 120 based on both the signal output from the auxiliary power state detection unit 110 and the signal output from the power monitoring unit 150.

In detail, when the auxiliary power source unit 120 is shortcircuited, a potential across the outputs (i.e., the power output and return/ground output from the auxiliary power source unit 120) of the auxiliary power source unit 120 is quickly reduced, which is detected by the auxiliary power state detection unit 110. However, although the potential across both outputs of the auxiliary power source unit 120 is quickly reduced when the auxiliary power source unit 120 is shortcircuited, the potential may also be quickly reduced during a discharge as auxiliary power is supplied. In some embodiments, it may be determined whether the potential across the outputs of the auxiliary power source unit 120 is reduced due to a shortcircuit (failure) or a discharge (normal operation). In some embodiments according to the inventive concept, it may be determined whether the potential across the outputs of the auxiliary power source unit 120 is reduced to less than a predetermined minimum value without identifying whether the cause is a shortcircuit or a discharge. Accordingly, a signal may be generated (and transmitted) that indicates that the output of the auxiliary power source unit 120 is low.

To this end, the power monitoring unit 150 may check whether power supplied by the main power source 10 is normal or abnormal to determine a shortcircuit. In other words, when power supplied by the main power source 10 is abnormal, the potential across the outputs of the auxiliary power source unit 120 may be reduced because auxiliary power is being supplied to the target system 20. By contrast, when power supplied by the main power source 10 is normal, auxiliary power may not be supplied to the target system 20, and thus the potential across the outputs of the auxiliary power source unit 12 is reduced because the auxiliary power source unit 120 is shortcircuited.

In conclusion, when a signal indicating that power supplied by the main power source 10 is normal is received from the power monitoring unit 150 and a signal indicating that a reduced potential across the outputs of the auxiliary power source unit 120 is received from the auxiliary power state detection unit 110, the charge stop signal generating unit 160 may determine that the auxiliary power source unit 120 is actually shortcircuited and may cause the auxiliary power charging unit 140 to block power to the auxiliary power source unit 120.

By contrast, when a signal indicating that power supplied by the main power source 10 is abnormal is received from the power monitoring unit 150 and a signal indicating that a reduced potential across the outputs of the auxiliary power source unit 120 is received from the auxiliary power state detection unit 110, the charge stop signal generating unit 160 may determine that power supplied by the main power source 10 is abnormal, instead of determining that the auxiliary power source unit 120 is shortcircuited, and may cause the auxiliary power charging unit 140 to supply power to the auxiliary power source unit 120.

The power monitoring unit 150 may be configured to detect a voltage of the main power and monitor whether the voltage is reduced to a value equal to or lower than a predetermined voltage. For example, the power monitoring unit 150 may be configured to recognize a point in time when a voltage is reduced to a value equal to or lower than the predetermined voltage by using an integrated circuit (IC) chip capable of detecting the specific voltage, such as TPS3898. Other circuits may also be used.

The auxiliary power charging unit 140 can receive power from the main power source 10 and charge the auxiliary power source unit 120. When the auxiliary power source unit 120 is shortcircuited, however, the auxiliary power charging unit 140 may protect the entire system by blocking current. Furthermore, the auxiliary power charging unit 140 may maintain the amount of current supplied to the auxiliary power source unit 120 as a constant in order to charge the auxiliary power source unit 120 and limit a maximum charging current.

A charger IC may be used as part of the auxiliary power charging unit 140 or a constant current circuit may be used. A charger IC that is widely used as an auxiliary power source of a portable device, such as a mobile phone or a tablet PC, may have a relatively simple circuit configuration and may perform various functions in software. The constant current circuit may be configured irrespective of a type of an auxiliary power source.

The auxiliary power state detection unit 110 may be a circuit that, when the auxiliary power source unit 120 is shortcircuited, signals the charge stop signal generating unit 160 and/or the system of the shortcircuit. The auxiliary power state detection unit 110 may include a resistor and a unidirectional element as described herein. For example, the unidirectional element may be a diode. Also, the resistor and the unidirectional element may be connected in series, as described, for example, in reference to FIG. 2. It will be further understood that any passive or active component may be substituted for the resistor given that an equivalent function can be provided by the passive or active component. For example, it will be understood that the passive or active component can be coupled between $v_{cc}$ and the unidirectional element so that the passive or active component is resistive such that the voltage can be developed across the passive or active component.

The auxiliary power supply unit 130 may cause the auxiliary power source unit 120 (instead of the main power source 10) to supply power to the target system 20 when power supplied by the main power source 10 is abnormal. The auxiliary power supply unit 130 may perform the function using a diode or a switching element. The use of the diode is suitable for an embodiment of FIGS. 8A and 8B. The switching element may, for example, supervise the main power source 10 and the auxiliary power source unit 120 according to a gate signal by controlling a gate using a signal of the power monitoring unit 150. However, the auxiliary power supply unit 130 is not limited to the above methods.

Figure 2:
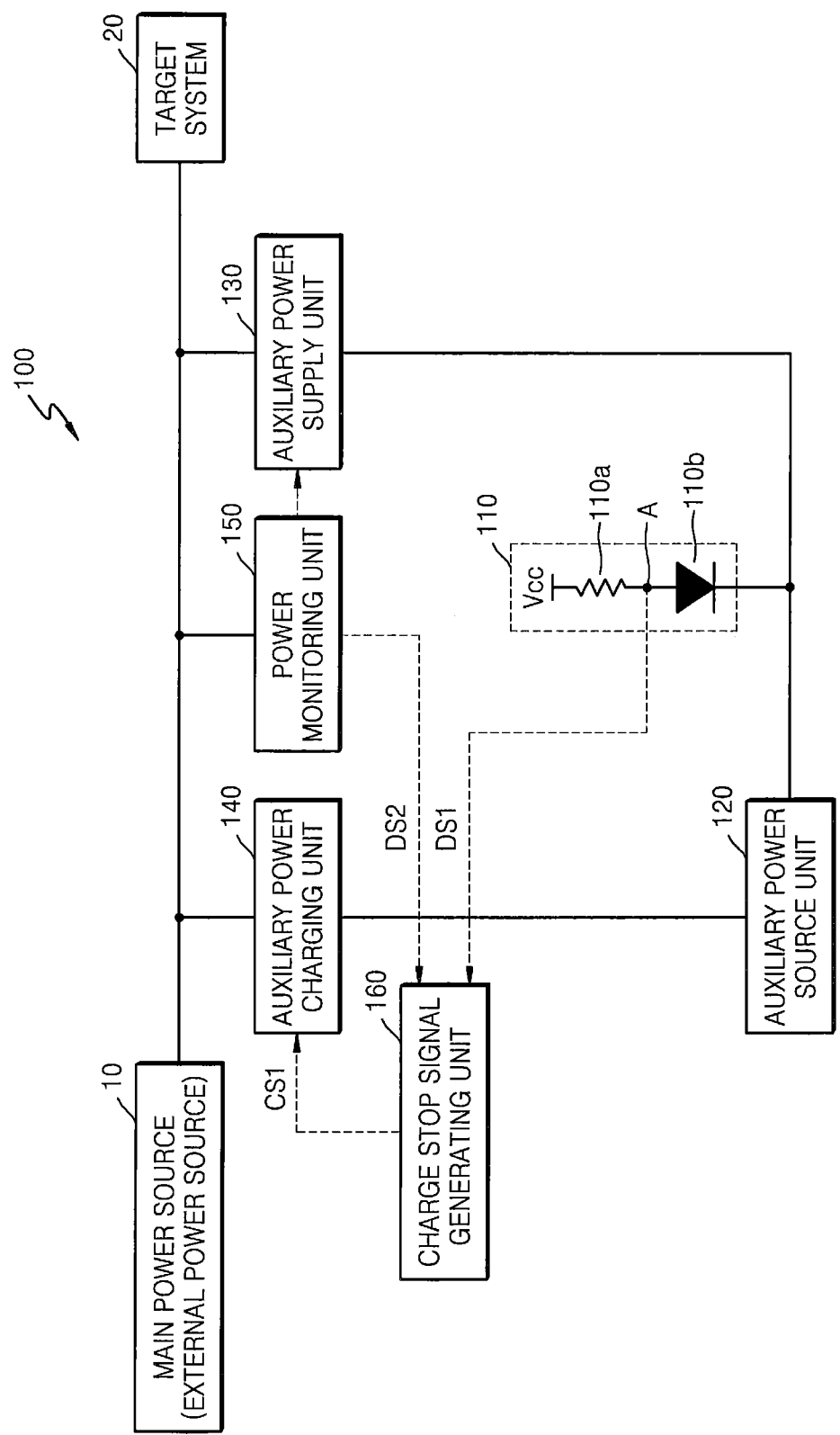
FIG. 2 is a block diagram of the auxiliary power supply device of FIG. 1, specifically illustrating an auxiliary power state detection unit in some embodiments according to the inventive concept.

FIG. 2 is a block diagram of the auxiliary power supply device 100 of FIG. 1, illustrating the auxiliary power state detection unit 110 in some embodiments according to the inventive concept.

As shown in FIG. 2, the auxiliary power state detection unit 110 includes a resistor 110a and a diode 110b. In particular, the resistor 110a and the diode 110b are connected in series. Where one terminal of the diode 110b may be connected to the resistor 110a, and the other terminal of the diode 110b may be connected to an output of the auxiliary power source unit 120.

Figure 3:
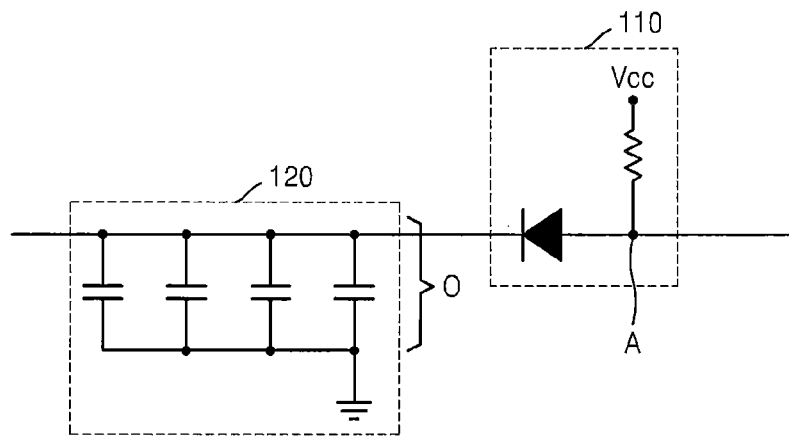
FIG. 3 is a circuit diagram illustrating the auxiliary power state detection unit and an auxiliary power source unit, according to some embodiments of the inventive concept.

FIG. 3 is a circuit diagram illustrating the auxiliary power state detection unit 110 and the auxiliary power source unit 120 according to some embodiments of the inventive concept. Referring to FIG. 3, the auxiliary power source unit 120 may include 4 capacitors that are connected in parallel. Although 4 capacitors are illustrated in FIG. 3, it will be understood that fewer or more capacitors may be used and may be connected in various combinations of parallel and series segments.

The first terminals of the capacitors are connected in parallel to ground and the second terminals of the capacitors may be connected to the auxiliary power state detection unit 110. If any one of the capacitors that are connected in parallel is shortcircuited, all of the capacitors are shortcircuited, and thus a potential across the output (0) of the auxiliary power source unit 120 is reduced. As a result, a potential between the resistor 110a and the diode 110b of the auxiliary power state detection unit 110 is also reduced.

Figure 4:
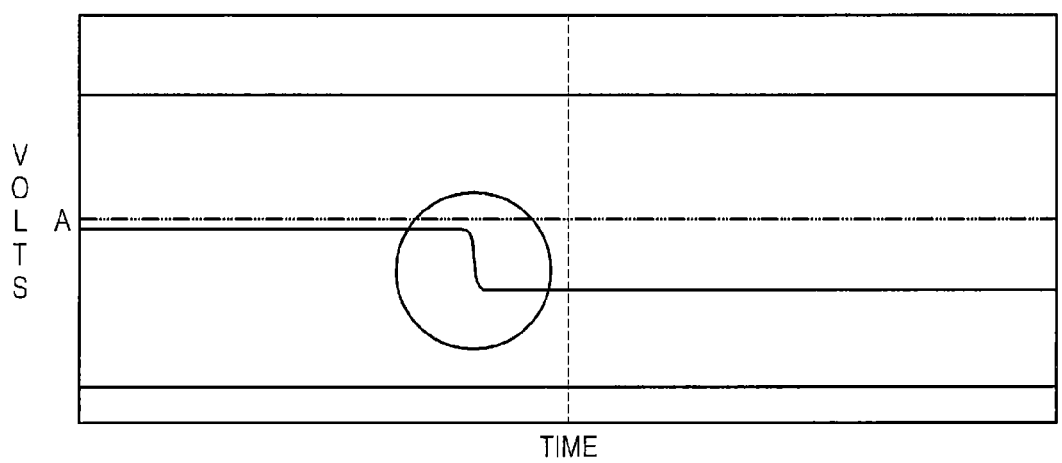
FIG. 4 is a graph of a relationship between time and potential between a resistor and a unidirectional element when a device illustrated in FIG. 3 is applied to a short-circuited capacitor.

FIG. 4 is graph illustrating a relationship between, time and potential at Node A when an experimental device as shown in FIG. 3 is forcedly shortcircuited. According to FIG. 4, the potential at Node A is reduced in a short period of time.

Accordingly, referring back to FIG. 2, a potential value between the resistor 110a and the diode 110b may be transmitted as an output signal DS1 of the auxiliary power state detection unit 110 to the charge stop signal generating unit 160. As described with reference to FIG. 1, the charge stop signal generating unit 160 determines whether the output signal DS1 is in low state, and also determines whether power supplied by the main power source 10 is normal by using an output signal DS2 of the power monitoring unit 150.

When the output signal DS1 is in a low state, it may mean that a potential between the resistor 110a and the diode 110b is less than a predetermined potential. Also, the output signal DS1 may be defined to be in high state unless the output signal DS1 is a low signal of a low state. In other words, the resistor 110a may "pull-up" the voltage at Node A unless the output at the auxiliary power source unit 120 is low. It will be understood that any signal levels (i.e., high vs. low) may be used for DS1 and DS2 to indicate the conditions described herein.

If the output signal DS1 is low and the output signal DS2 indicates "normal" power, it is determined that the auxiliary power source unit 120 is shortcircuited. Accordingly, the charge stop signal generating unit 160 outputs a charge stop signal CS1 to the auxiliary power charging unit 140. The auxiliary power charging unit 140 that receives the charge stop signal CS1 stops charging of the auxiliary power source unit 120 by blocking power to the auxiliary power source unit 120.

Since the auxiliary power state detection unit 110 includes the diode 110b and the resistor 110a as shown in FIGS. 2 and 3, a structure of the auxiliary power state detection unit 110 can be relatively simple and thus the auxiliary power state detection unit 110 may be easily included in the system 100. Also, since the structure of the auxiliary power state detection unit 110 is simple, the risk of failure may be low and power consumption may be low, thereby contributing to low power consumption of the entire system. For example, current consumed by the auxiliary power state detection unit 110 may be less than about 100 nA.

Figure 5:
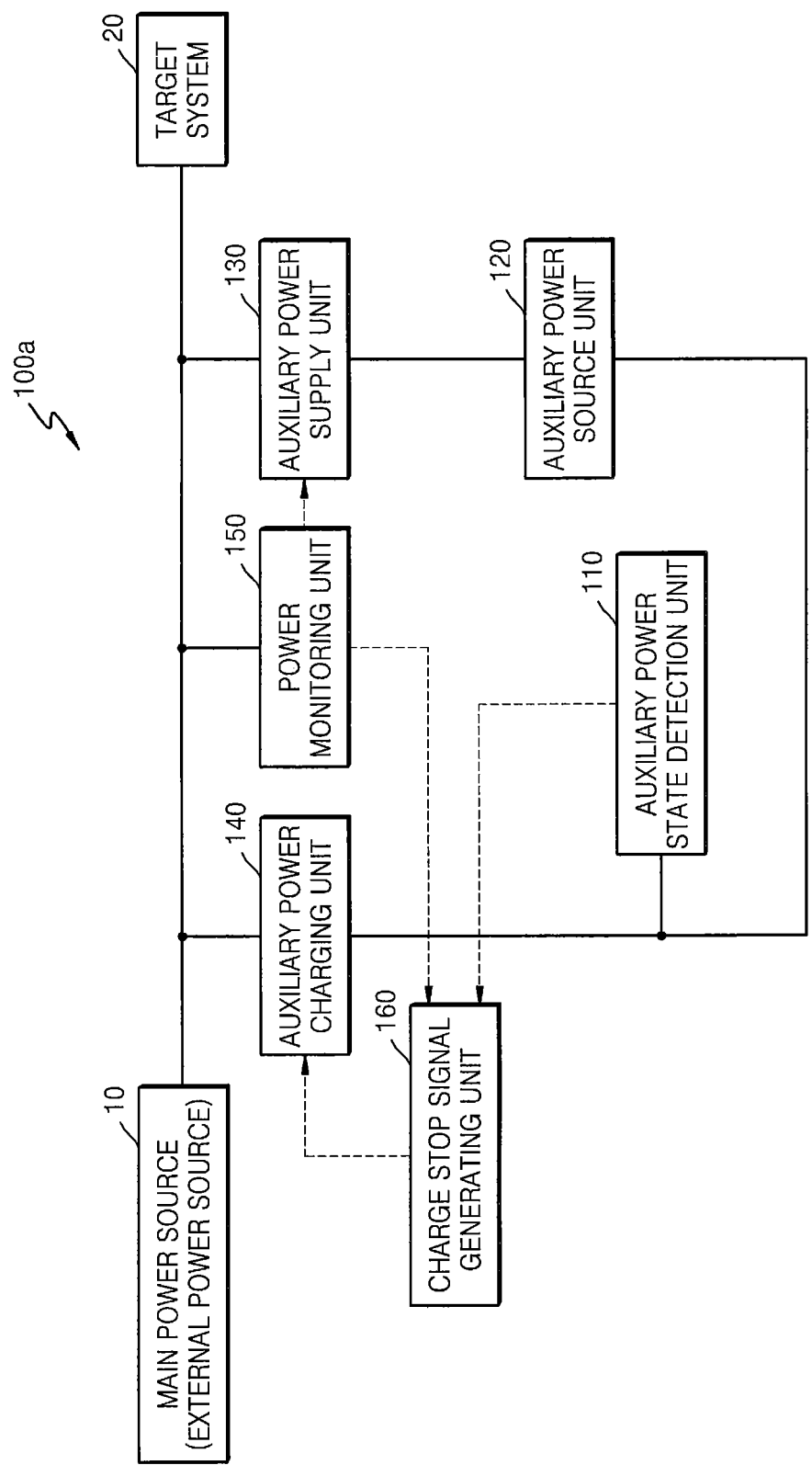
FIG. 5 is a block diagram illustrating an auxiliary power supply device according to some embodiments of the inventive concept.

FIG. 5 is a block diagram illustrating an auxiliary power supply device 100a according to another embodiment of the inventive concept.

According to FIG. 5, the auxiliary power state detection unit 110 is connected to an input of the auxiliary power source unit 120, such that the auxiliary power state detection unit 110 can detect the shortcircuit across the inputs in a similar fashion to that described in reference to, for example FIG. 1.

Figure 6:
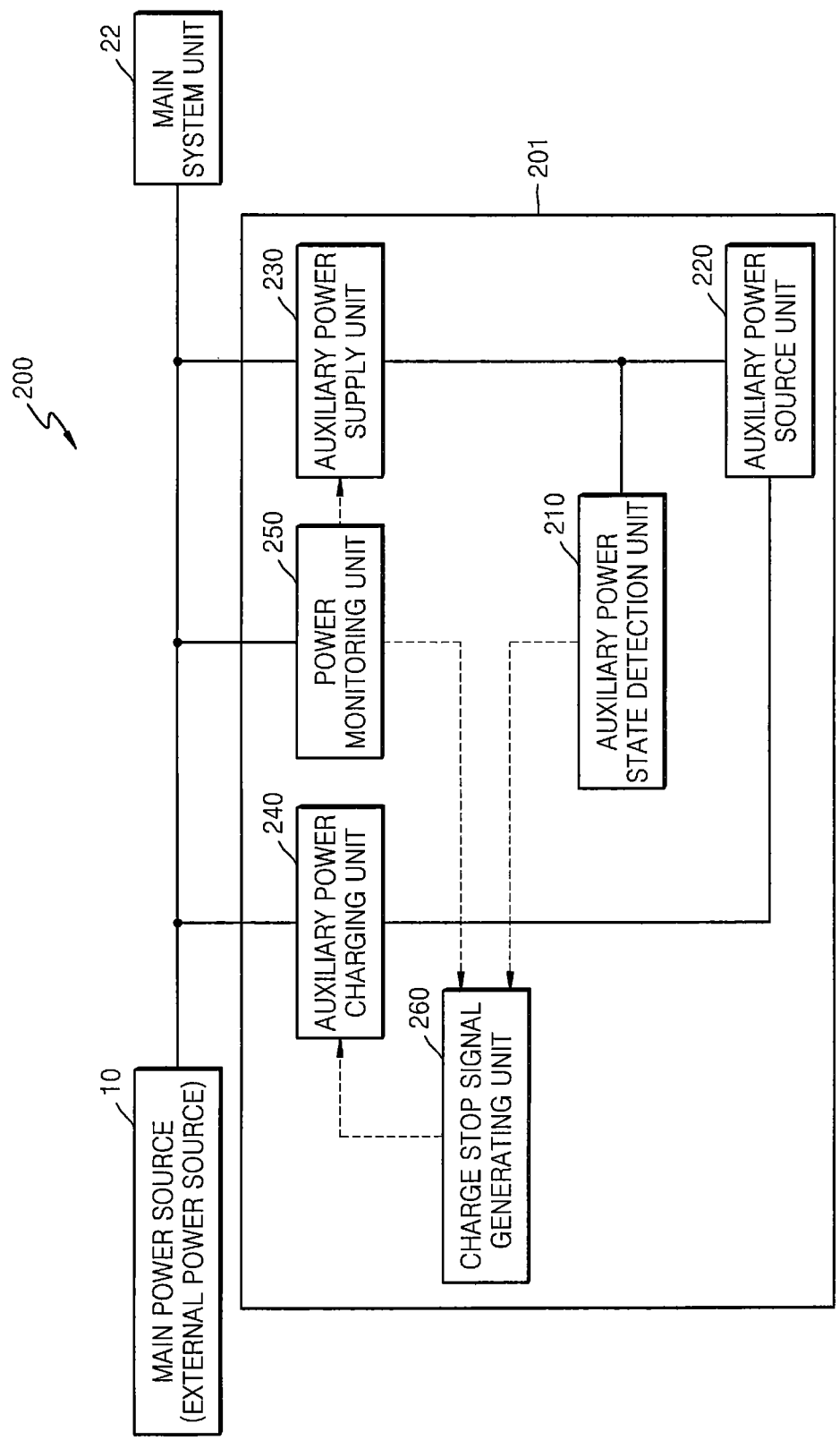
FIG. 6 is a block diagram illustrating an electronic system according to some embodiments of the inventive concept.

FIG. 6 is a block diagram illustrating an electronic system 200 according to some embodiments of the inventive concept. Referring to FIG. 6, the electronic system 200 includes a power management unit 201 and a main system unit 22. The power management unit 201 may include an auxiliary power source unit 220 that stores electrical energy to be supplied as auxiliary power, an auxiliary power state detection unit 210 that is connected to, for example, an output of the auxiliary power source unit 220, and an auxiliary power supply unit 230 that is configured to receive the auxiliary power from the auxiliary power source unit 220 and supply the auxiliary power to the main system unit 22 when power supplied by the main power source 10 is abnormal.

In this case, the auxiliary power state detection unit 210 may include a resistor and a unidirectional element. The unidirectional element may be, for example, a diode.

A power monitoring unit 250 continuously detects whether power supplied by the main power source 10 (i.e., an external power source unit) is normal or abnormal, and transmits a corresponding output signal to a charge stop signal generating unit 260. Also, the auxiliary power state detection unit 210 can continuously monitor whether the auxiliary power source unit 220 is shortcircuited and transmits a corresponding output signal to the charge stop signal generating unit 260. The charge stop signal generating unit 260 receives output signals from the power monitoring unit 250 and the auxiliary power state detection unit 210, and when the signal output received from the auxiliary power state detection unit 210 is a low signal and the output signal received from the power monitoring unit 250 is a signal indicating normal conditions, outputs a charge stop signal. In this case, if the output signal received from the power monitoring unit 250 is a signal indicating an abnormality in the power, the charge stop signal generating unit 260 does not output a charge stop signal. An auxiliary power charging unit 240 may receive the charge stop signal and may block power supply to the auxiliary power source unit 220.

The main system unit 22 may be any electronic system that may receive power from the main power source 10. For example, the main system unit 22 may be, but is not limited to, a solid-state drive (SSD), a hard disk drive, a notebook PC, a tablet PC, a mobile phone, a portable multimedia player (PMP), or a navigation system. The operation and function of each element and the relationship of each element with other elements in FIG. 6 can be the same as those described in FIG. 1.

Figure 7:
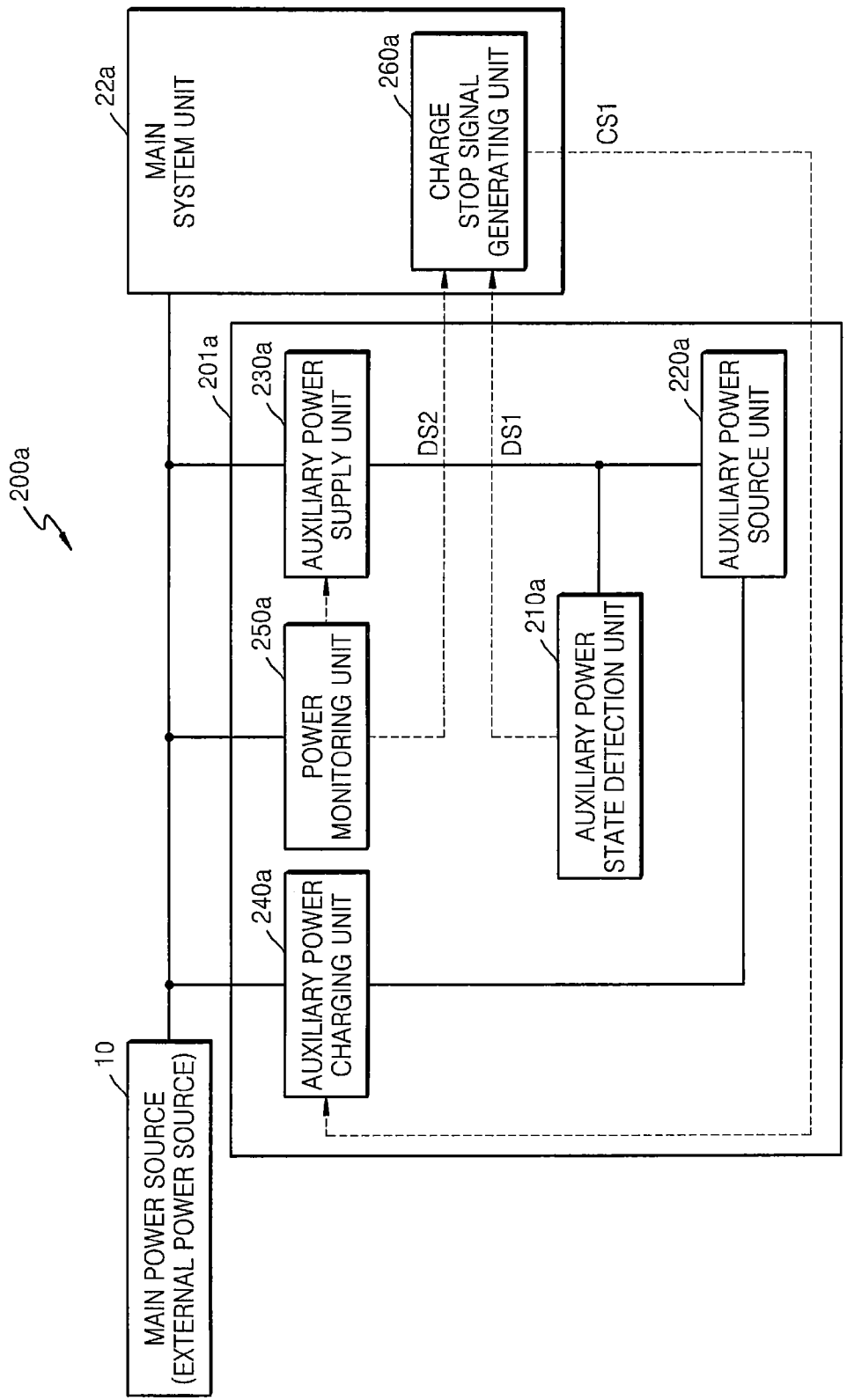
FIG. 7 is a block diagram illustrating an electronic system according to some embodiments of the inventive concept.

FIG. 7 is a block diagram illustrating an electronic system 200a according to some embodiments of the inventive concept. According to FIG. 7, the electronic system 200a integrates a charge stop signal generating unit 260a into a main system unit 22a. That is, the charge stop signal generating unit is integrated into the power management unit 201 in FIG. 6 whereas the charge stop signal generating unit is integrated into the main system unit 22a.

Accordingly, the charge stop signal generating unit 260a may be embedded in a microprocessor that is disposed in the main system unit 22a. Optionally, the charge stop signal generating unit 260a may be a part of firmware in the microprocessor.

As shown above in FIG. 7, a power management unit 201a includes an auxiliary power source unit 220a that stores electrical energy to be supplied as auxiliary power. An auxiliary power state detection unit 210a is connected to outputs (or inputs) of the auxiliary power source unit 220a, and an auxiliary power supply unit 230a that is configured to receive the auxiliary power from the auxiliary power source unit 220a, and supply the auxiliary power to a main system unit 22a when power supplied by the main power source 10 is abnormal. In this case, the auxiliary power state detection unit 210a may include a resistor and a unidirectional element. The unidirectional element may be, for example, a diode.

A power monitoring unit 250a can continuously detect whether power supplied by the main power source 10 (i.e., an external power source) is normal and transmits a corresponding output signal to a charge stop signal generating unit 260a that is disposed in the main system unit 22a. Also, the auxiliary power state detection unit 210a can continuously monitor whether the auxiliary power source unit 220a is shortcircuited and transmit a corresponding output signal to the charge stop signal generating unit 260a that is disposed in the main system unit 22a. The charge stop signal generating unit 260a that is disposed in the main system unit 22a receives the output signals from the power monitoring unit 250a and the auxiliary power state detection unit 210a, and outputs a charge stop signal when the output signal received from the auxiliary power state detection unit 210*a* is a low signal and the output signal received from the power monitoring unit 250*a* signal indicates normal operation. In this case, if the output signal received from the power monitoring unit 250*a* indicates abnormal power, the charge stop signal generating unit 260*a* does not output a charge stop signal.

An auxiliary power charging unit 240*a* may receive the charge stop signal and may block power to the auxiliary power source unit 220*a*.

Assuming that the electronic system 200*a* is an SSD, data in a volatile memory, such as a cache memory, may need to be stored in a nonvolatile memory without data loss upon sudden power-off (SPO). When an output signal DS2 (transmitted by the power monitoring unit 250*a* to the charge stop signal generating unit 260) indicates that power supplied by the main power source 110 is abnormal, the charge stop signal generating unit 260*a* that receives the output signal DS2 may use the output signal DS2 not only for the auxiliary power charging unit 240*a* but also to indicate a power off state to the electronic system 200*a*. As a result, the electronic system 200*a* may complete a current operation and may not perform an additional operation. Also, the electronic system 200 may complete data protection and may be stably shut down.

Also, the main system unit 22*a* may be configured to change a cache mode based on an output signal DS1, which the charge stop signal generating unit 260*a* receives from the auxiliary power state detection unit 210*a*. In other words, when the output signal DS1 is in a high state, the main system unit 22*a* may have a write cache mode in an on state, and when the output signal DS1 is changed to a low state, the main system unit 22*a* may change the write cache mode to an off state in order to protect user data, as described for example with reference to FIG. 10B.

Data received from an external host may be temporarily stored in a high-speed volatile memory such as a dynamic random-access memory (DRAM), and then may be stored in a nonvolatile memory such as a NAND by using firmware of the main system unit 22*a*. In this case, when the write cache mode is in an on state, an acknowledgement signal ACK may be transmitted to the external host when the data that is received from the external host is stored in the DRAM. When the write cache mode is in an off state, an acknowledgement signal ACK may be transmitted after the data that is received from the external host is stored in the DRAM and then is stored in the nonvolatile memory by using the firmware.

Figure 8A:
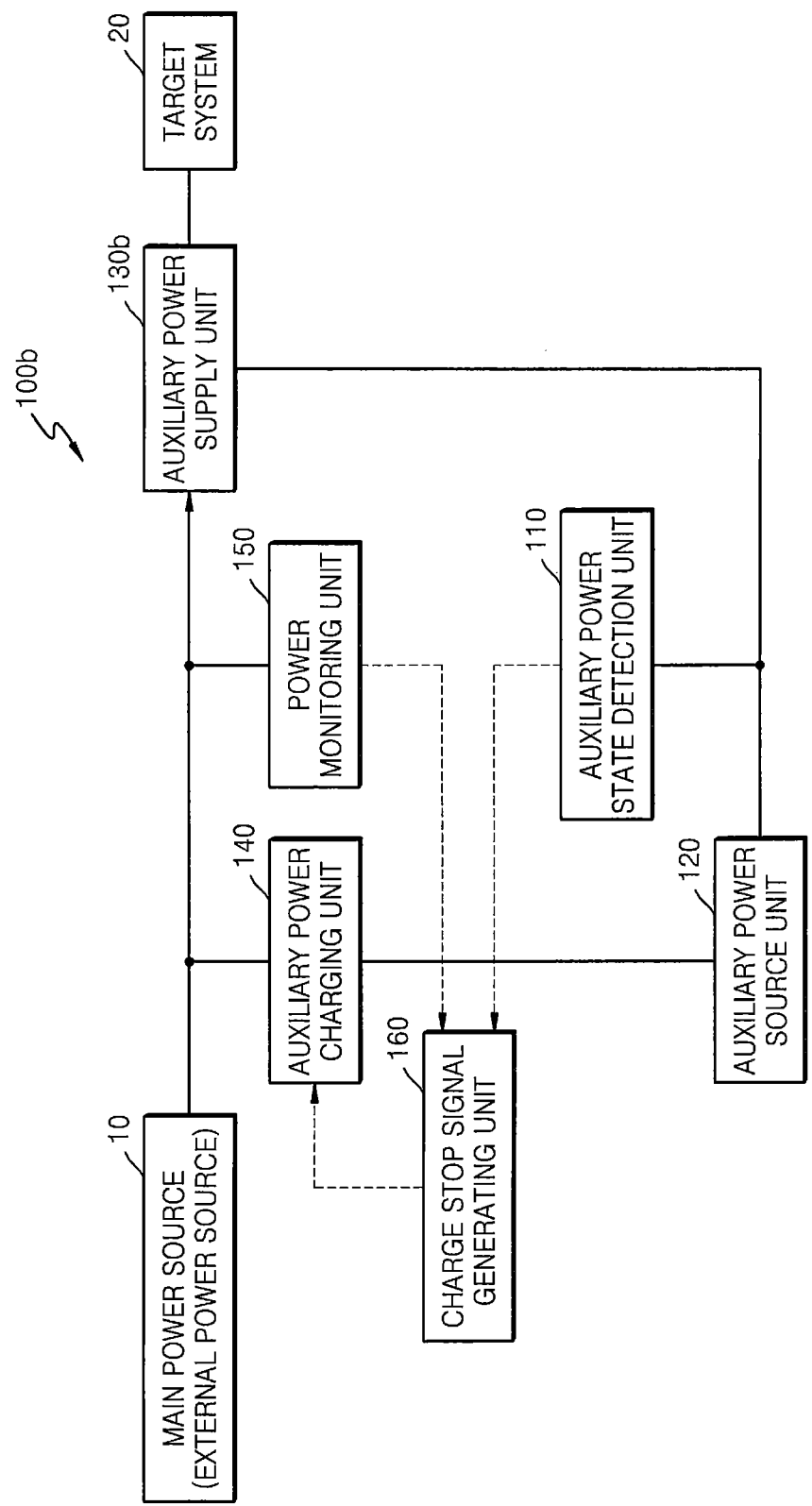
FIG. 8A is a block diagram illustrating an auxiliary power supply device according to some embodiments of the inventive concept.
Figure 8B:
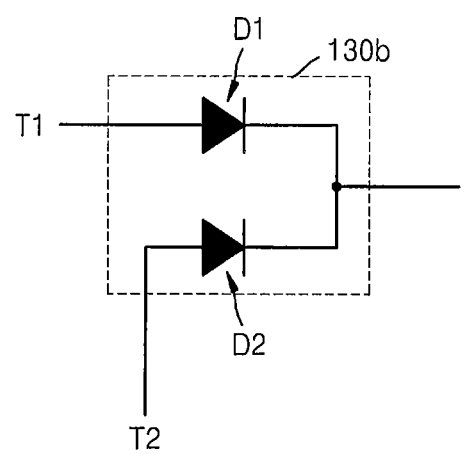
FIG. 8B is a circuit diagram illustrating an auxiliary power supply unit of the auxiliary power supply device of FIG. 8A in some embodiments according to the inventive concept.

FIG. 8A is a block diagram illustrating an auxiliary power supply device 100*b* according to some embodiments of the inventive concept. Referring to FIG. 8B, an auxiliary power supply unit 130*b* is connected between the main power source 10 and the target system 20. The auxiliary power supply unit 130*b* may be configured to use diodes, a diode is disposed on each of a main power source and an auxiliary power source and when the main power source is turned off, the auxiliary power source automatically operates.

Referring to FIG. 8B, the auxiliary power supply unit 130*b* may include two diodes. One terminal T1 of a first diode D1 may be connected to the main power source 10, and one terminal T2 of a second diode D2 may be connected to the auxiliary power source unit 120. Also, the other terminals of the first diode D1 and the second diode D2 may be connected to each other and connected to the target system 20.

A voltage supplied from the main power source 10 is adjusted to be slightly higher than a voltage supplied from the auxiliary power source unit 120. This is because even when power is normally supplied from the main power source 10 through the first diode D1, despite the voltage drop across the first diode D1, a potential at the cathode of the first diode D1 may be higher than a potential at T2 of the second diode D2. Accordingly, power is not substantially supplied from the auxiliary power source unit 120 to the target system 20 through the second diode D2. When the main power source 10 is turned off, a voltage that is supplied from the auxiliary power source unit 120 is further increased, power is automatically supplied from the auxiliary power source unit 120 to the target system 20.

Figure 9:
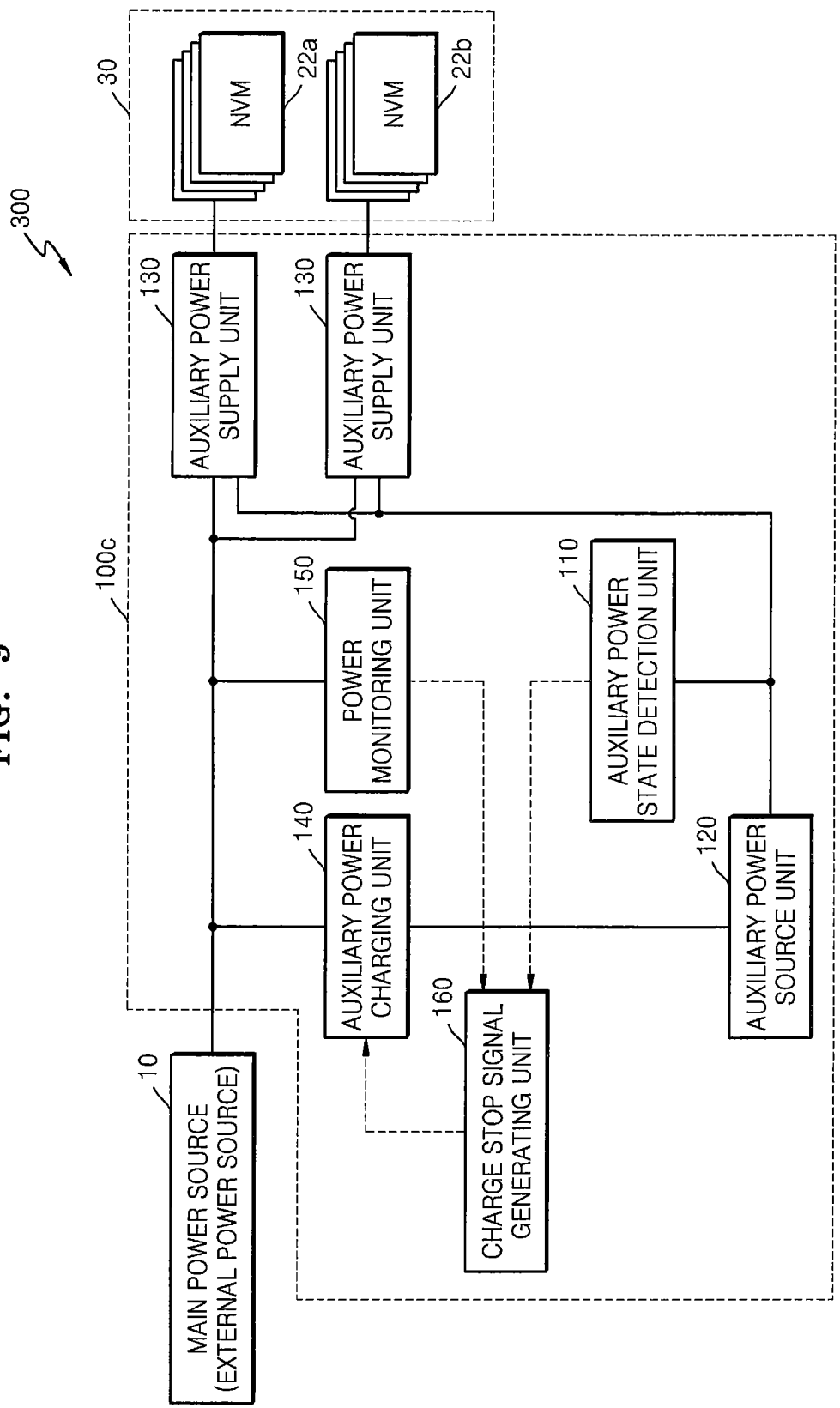
FIG. 9 is a block diagram illustrating a solid-state drive (SSD) according to some embodiments of the inventive concept.

FIG. 9 is a block diagram illustrating an SSD 300 according to some embodiments of the inventive concept. Referring to FIG. 9, the SSD 300 may include an auxiliary power supply device 100*c* and an auxiliary memory main system unit 30. The auxiliary memory main system unit 30 may include a plurality of chip groups 22*a* and 22*b* each including a plurality of nonvolatile memories (NVMs) and may be configured to supply power and transmit/receive a signal. Although the auxiliary memory main system unit 30 includes two chip groups in FIG. 9, it will be understood by one of ordinary skill in the art that the auxiliary memory main system unit 30 may include more chip groups.

The auxiliary power supply device 100*c* may include a plurality of the auxiliary power supply units 130 the number of which corresponds to the number of chip groups of the auxiliary memory main system unit 30. Since the plurality of auxiliary power supply units 130 are provided to correspond to the chip groups of the auxiliary memory main system unit 30, backup power may be more stably supplied to the individual chip groups.

Figure 10A:
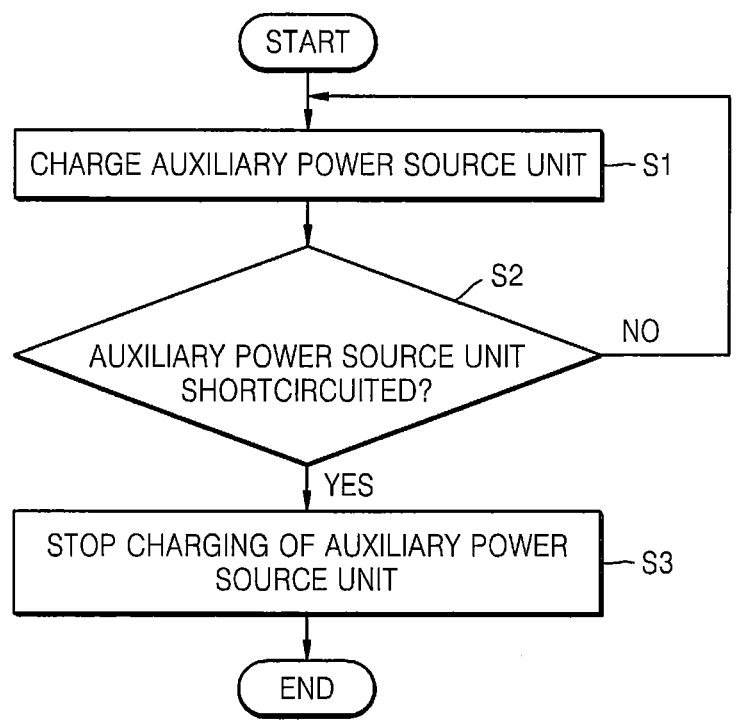
FIG. 10A is a flowchart illustrating methods of managing auxiliary power, according to some embodiments of the inventive concept.
Figure 10B:
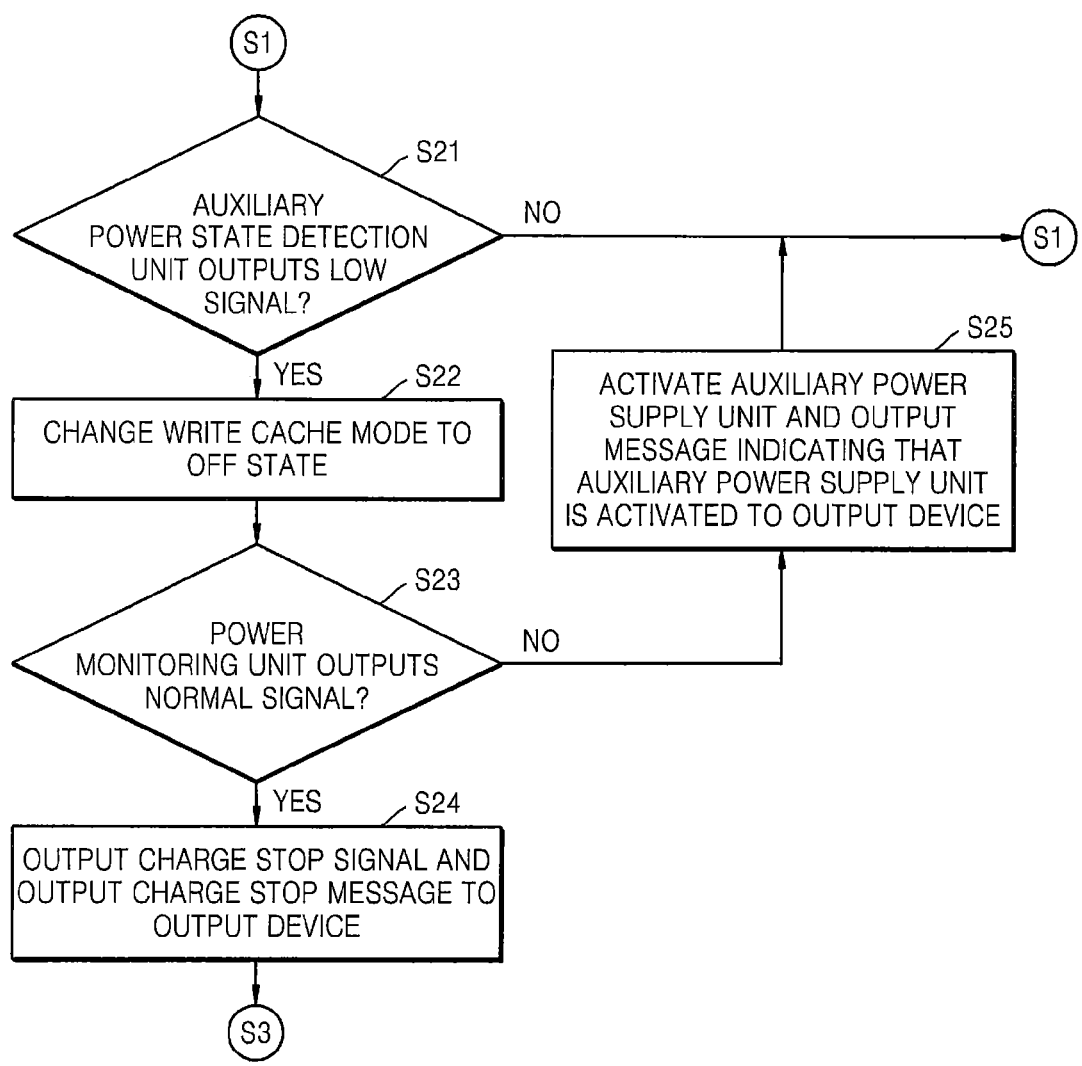
FIG. 10B is a flowchart illustrating operations in which it is determined whether the auxiliary power source unit is shortcircuited in the method of FIG. 10A in some embodiments according to the inventive concept.

FIG. 10A is a flowchart illustrating methods of managing auxiliary power, according to some embodiments of the inventive concept. FIG. 10B is a flowchart illustrating operation S2 of FIG. 10A. Referring to FIG. 10A, in operation S1, the auxiliary power source unit 120 is charged when the auxiliary power charging unit 140 supplies power from the main power source 10 to the auxiliary power source unit 120.

In operation S2, the auxiliary power state detection unit 110, that is connected to for example an output of the auxiliary power source unit 120, determines whether the auxiliary power source unit 120 is shortcircuited. When it is determined in operation S2 that the auxiliary power source unit 120 is not shortcircuited, the method returns to operation S1 in which the auxiliary power source unit 120 may be continuously charged. When it is determined in operation S2 that the auxiliary power source unit 120 is shortcircuited, the method proceeds to operation S3. In operation S3, the auxiliary power charging unit 140s may stop power supplied to the auxiliary power source unit 120.

Referring to FIG. 10B, operation S2 (in which it is determined whether the auxiliary power source unit 120 is shortcircuited) may include operation S21 in which it is determined that the auxiliary power source unit 120 is shortcircuited when a low signal is output from the auxiliary power state detection unit 110.

When the low signal is output from the auxiliary power state detection unit 110, the method proceeds to operation S22. In operation S22, a write cache mode may be changed to an off state in order to more surely protect user data. As described above, only after the write cache mode is changed to an off state and data received from an external host is stored in a DRAM and then in a nonvolatile memory by using firmware, an acknowledgement signal ACK may be transmitted to the external host.

In operation S23, it may be determined whether the power monitoring unit 150 outputs a "normal" signal indicating that power supplied by the main power source 10 is normal. If it is determined in operation S23 that the power monitoring unit 150 outputs a "normal" signal indicating that power supplied by the main power source 10 is normal, the method proceeds to operation S24. In operation S24, the charge stop signal generating unit 160 may generate a charge stop signal based on the "normal" signal and the low signal. The charge stop signal may be transmitted to the auxiliary power charging unit 140, so that the auxiliary power charging unit 140 may block power to the auxiliary power source unit 120. Also, a message indicating that charging has stopped may be output in real time to an output device in order for a user to know this state. The output device may be any output device such as a monitor, a printer, or a mobile phone. It will be understood that an absence of the abnormal signal may also be interpreted as an indication of the normal condition described herein.

If it is determined in operation S23 that the power monitoring unit 150 outputs an "abnormal" signal (indicating that power supplied by the main power source 10 is abnormal), the method proceeds to operation S25. In operation S25, the auxiliary power supply unit 130 may be activated to supply auxiliary power to the target system 20. Also, a message indicating that the auxiliary power supply unit 130 is activated may be output in real time to the output device in order for the user to know this state. The output device may be any output device such as a monitor, a printer, or a mobile phone. It will be understood that an absence of the normal signal may also be interpreted as an indication of the abnormal condition described herein.

Figure 11:
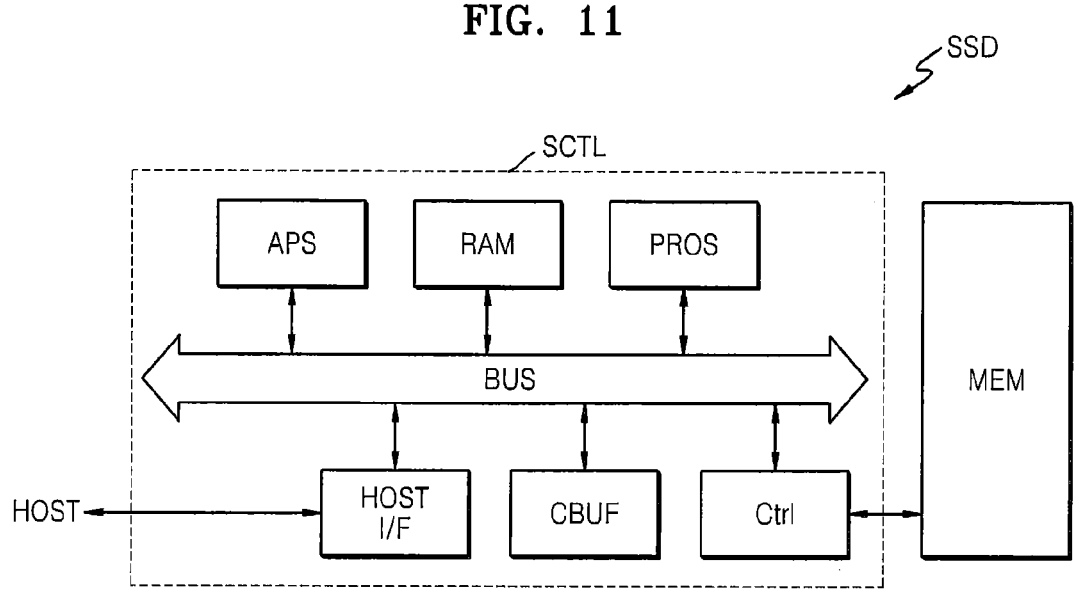
FIG. 11 is a block diagram illustrating an SSD according to some embodiments of the inventive concept.

FIG. 11 is a block diagram illustrating an SSD according to some embodiments of the inventive concept. Referring to FIG. 11, the SSD may include an SSD controller SCTL and a flash memory MEM. The SSD controller SCTL may include an auxiliary power source device APS, a processor PROS, a random-access memory RAM, a cache buffer CBUF, and a memory controller Ctrl which are connected to one another via a bus BUS.

Upon SPO of a main power source device, the SSD may operate by using auxiliary power that is stored in the auxiliary power source device APS. The processor PROS controls the memory controller Ctrl to transmit/receive data to/from the flash memory MEM in response to a request (a command, an address, or data) of a host. The processor PROS and the memory controller Ctrl of the SSD may be embodied as one or more ARM processors. Data necessary to operate the processor PROS may be loaded into the random-access memory RAM.

A host interface HOST I/F receives a request of the host and transmits the request to the processor PROS, or transmits data transmitted from the flash memory MEM to the host. The host interface HOST I/F may interface with the host via any of various interface protocols such as a universal serial bus (USB), multi-media card (MMC), peripheral component interconnect-express (PCI-E), serial advanced technology attachment (SATA), parallel advanced technology attachment (PATA), small computer system interface (SCSI), enhanced small device interface (ESDI), or intelligent drive electronics (IDE). Data to be transmitted to the flash memory MEM or transmitted from the flash memory MEM may be temporarily stored in the cache buffer CBUF. The cache buffer CBUF may be a static random-access memory (SRAM).

Figure 12:
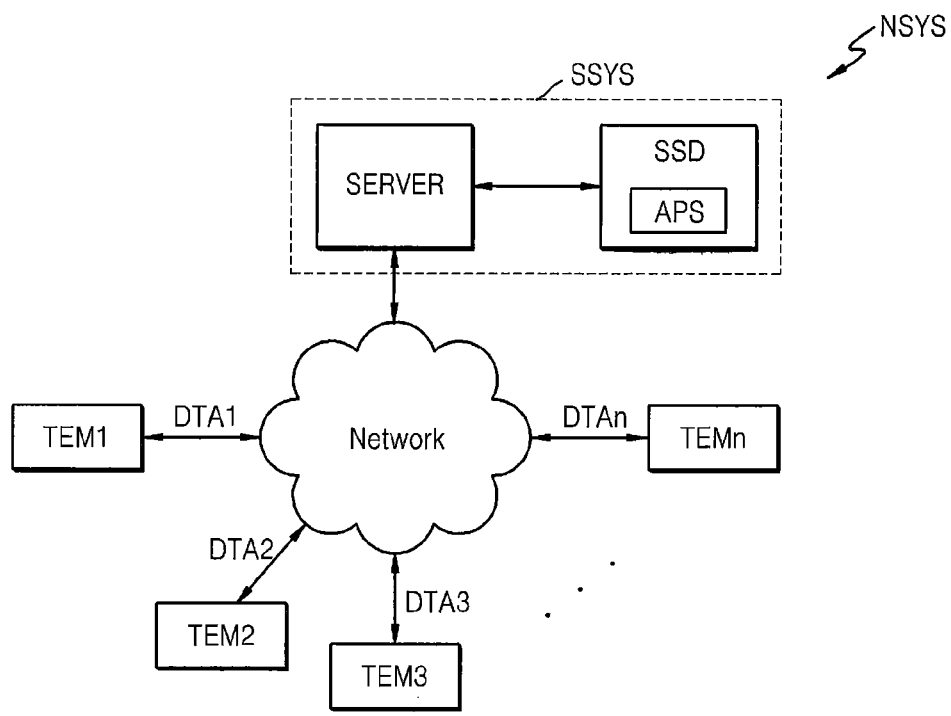
FIG. 12 is a block diagram illustrating a network system including an auxiliary power source device according to some embodiments of the inventive concept.

FIG. 12 is a block diagram illustrating a network system NSYS including an auxiliary power source device APS, according to some embodiments of the inventive concept. Referring to FIG. 12, an SSD including the auxiliary power source device APS may be included in a server system SSYS that is connected to the network system NSYS. Upon SPO of a main power source device, the server system SSYS may operate by using auxiliary power that is stored in the auxiliary power source device APS. The network system NSYS may include the server system SSYS and a plurality of terminals TEM1 through TEMn which are connected through a network. The server system SSYS may include a server SERVER that processes requests received from the plurality of terminals TEM1 through TEMn that are connected to the network and the SSD that stores data DTA1 through DTAn that correspond to the requests received from the terminals TEM1 through TEMn. In this case, the SSD of FIG. 12 may be the SSD of FIG. 11. That is, the SSD of FIG. 12 may include the SSD controller SCTL and the flash memory MEM of FIG. 11.

Figure 13:
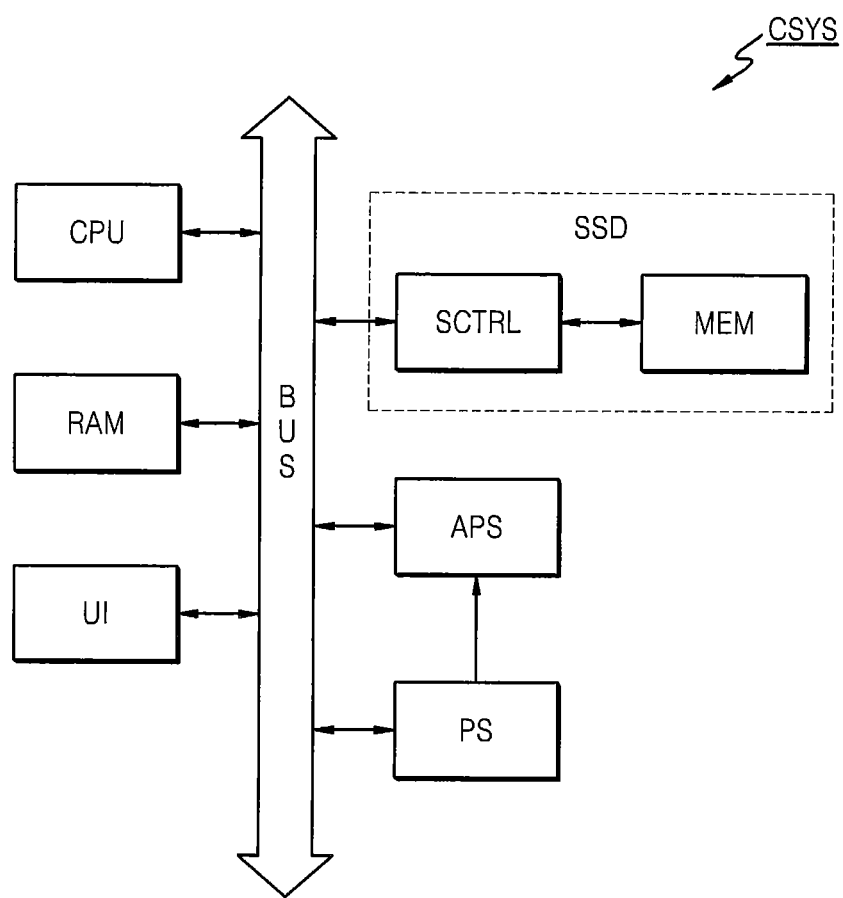
FIG. 13 is a block diagram illustrating a computing system device according to some embodiments of the inventive concept.

FIG. 13 is a block diagram illustrating a computing system device CSYS according to some embodiments of the inventive concept. Referring to FIG. 13, the computing system device CSYS includes a power supply device PS that is a main power source device electrically connected to a bus BUS, an auxiliary power source device APS, a processor CPU, a user interface UI, and an SSD. The SSD includes an SSD controller SCTRL and a flash memory MEM. N-bit data (N is an integer equal to or greater than 1) processed or to be processed by the processor CPU may be stored in the flash memory MEM by using the SSD controller SCTRL. The SSD of FIG. 13 may be the SSD of FIG. 11.

Upon SPO of the power supply device PS, the computing system device CSYS may operate by using auxiliary power that is stored in the auxiliary power source device APS. The computing system device CSYS may further include a system memory, including a RAM.

When the computing system device CSYS is a mobile device, the computing system device CSYS may be further provided with a battery for supplying an operating voltage and a modem such as a baseband chipset. Also, it will be understood that the computing system device CSYS may be further provided with an application chipset, a camera image processor (CIP), or a mobile DRAM.

When a capacitor that is included in the auxiliary power source device APS, does not operate normally, the auxiliary power source device may fail to supply auxiliary power. Accordingly, a state of the capacitor can be efficiently monitored. In the SSD that is included in a server system, if the number of flash channels is expected to increase, and the auxiliary power source device APS may include a plurality of capacitors in order to deal with increasing peak power. Accordingly, the reliability and increase the lifespan of the auxiliary power source device APS may be improved by including the plurality of capacitors.

According to some embodiments of the inventive concept, an auxiliary power source device configured to efficiently monitor and control a state of an auxiliary power source such as a capacitor may be provided. Since the state of the auxiliary power source, such as the capacitor, is simply and accurately monitored, a defective capacitor may be replaced. Accordingly, the reliability of the auxiliary power source device may be improved and the lifespan of the auxiliary power source device may be increased.

A charge stop signal generating unit that determines whether to continuously supply power to the auxiliary power source determines whether a detection signal is toggled and is in a low state. Accordingly, since the charge stop signal generating unit may be embodied as such, the overhead of an entire system may be reduced. Even when an auxiliary power charging unit supplies power, not only discontinuously but also continuously, the auxiliary power source device may efficiently monitor the state of the capacitor.

In the drawings and specification, there have been disclosed typical preferred embodiments of the inventive concept and, although specific terms are employed, they are used in a generic and descriptive sense only and not for purposes of limitation, the scope of the inventive concept being set forth in the following claims.

What is claimed:

1. An auxiliary power supply device comprising:
an auxiliary power source configured to provide auxiliary power;
an auxiliary power state detection circuit electrically coupled to an input or an output of the auxiliary power source, the auxiliary power state detection circuit being configured to output an output signal in one of a first state indicating a short circuit of the auxiliary power source and a second state indicating a normal operation of the auxiliary power source;
an auxiliary power charging circuit that is configured to charge the auxiliary power source using the main power source based on the state of the output signal;
an auxiliary power supply circuit that is electrically coupled to the output of the auxiliary power source, the auxiliary power supply circuit configured to provide the auxiliary power to a target system when power supplied to the target system by a main power source is abnormal; and
a power monitoring circuit that is configured to activate the auxiliary power supply circuit to provide the auxiliary power to the target system responsive to determining that the power supplied to the target system is abnormal;
wherein the auxiliary power supply device is configured to transmit a charge stop signal to the auxiliary power charging circuit based on the output signal being in the first state and a normality signal generated by the power monitoring circuit responsive to determining that the power supplied from the main power source is normal; and
wherein the auxiliary power charging circuit is configured to stop charging the auxiliary power source responsive to the charge stop signal.

2. The auxiliary power supply device of claim 1, wherein the auxiliary power state detection circuit comprises a resistive element and a unidirectional element.

3. The auxiliary power supply device of claim 2, wherein the unidirectional element comprises a diode.

4. The auxiliary power supply device of claim 2, wherein the resistive element and the unidirectional element are electrically coupled in series with one another.

5. The auxiliary power supply device of claim 4, wherein a first terminal of the unidirectional element is electrically coupled to the resistive element and a second terminal of the unidirectional element is electrically coupled to the auxiliary power source.

6. The auxiliary power supply device of claim 4, wherein the unidirectional element is a diode and an anode of the diode is electrically coupled to the resistive element and a cathode of the diode is electrically coupled to the auxiliary power source.

7. The auxiliary power supply device of claim 2, wherein current consumed by the auxiliary power state detection circuit is less than about 100 nA.

8. An electronic system comprising a main system circuit and a power management circuit, wherein the power management circuit comprises:
an auxiliary power source configured to provide auxiliary power;
an auxiliary power state detection circuit electrically coupled to an input or an output of the auxiliary power source and configured to output an output signal in one of a first state and a second state based on a state of the auxiliary power source;
an auxiliary power charging circuit that is configured to charge the auxiliary power source based on the state of the output signal; and
an auxiliary power supply circuit electrically coupled to the auxiliary power source, the auxiliary power supply circuit configured to supply the auxiliary power to the main system circuit responsive to determining that power from a main power source is abnormal,
wherein the auxiliary power state detection circuit comprises a resistive element and a unidirectional element and the output signal is generated at a node connecting the resistive element to the unidirectional element.

9. The electronic system of claim 8, wherein the auxiliary power state detection circuit is configured to output the output signal in the first state when the auxiliary power source output is less than a predetermined minimum value.

10. The electronic system of claim 9, further comprising:
a charge stop signal generating circuit that is configured to transmit a charge stop signal to the auxiliary power charging circuit responsive to the output signal being in the first state and an indication that power from the main power source is normal.

11. An auxiliary power supply device comprising:
an auxiliary power source configured to provide auxiliary power for a target system responsive to determining that main power to the target system is abnormal;
an auxiliary power state detection circuit coupled to an input or an output of the auxiliary power source and comprising a unidirectional element and a resistive element connected at an output node, the unidirectional element being configured to drive an output signal at the output node to a first state responsive to a short circuit of the auxiliary power source;
wherein the auxiliary power source is rechargeable based on the state of the output signal at the output node.

12. The auxiliary power supply device of claim 11 wherein the unidirectional element comprises a diode and the resistive element comprises a resistor.

13. The auxiliary power supply device of claim 11 wherein the unidirectional element is a first unidirectional element, the auxiliary power supply device further comprising:
an auxiliary power supply circuit electrically coupled to the main power and to the output of the auxiliary power source, wherein the auxiliary power supply circuit comprises a second unidirectional element coupled in series between a power input of the target system and the main power, and a third unidirectional element coupled in series between the output of the auxiliary power source and the power input of the target system.

14. The auxiliary power supply device of claim 13 wherein the target system comprises a main system, wherein the main system comprises:

a charge stop signal generating circuit configured to receive an indication of normal main power and the output signal of the auxiliary power state detection circuit.

15. The auxiliary power supply device of claim 14 further comprising:
an auxiliary power charging circuit electrically coupled to the charge stop signal generating circuit and configured to stop charging the auxiliary power source responsive to the indication of normal main power and the output signal of the auxiliary power state detection circuit being in the first state.

* * * * *